(12) United States Patent
Nelson

(10) Patent No.: US 9,851,591 B2
(45) Date of Patent: Dec. 26, 2017

(54) BROADBAND OPTICAL ISOLATOR OR CIRCULAR POLARIZER

(71) Applicant: Moxtek, Inc., Orem, UT (US)

(72) Inventor: David Vern Nelson, Orem, UT (US)

(73) Assignee: Moxtek, Inc., Orem, UT (US)

( * ) Notice: Subject to any disclaimer, the term of this patent is extended or adjusted under 35 U.S.C. 154(b) by 0 days.

(21) Appl. No.: 15/404,435

(22) Filed: Jan. 12, 2017

(65) Prior Publication Data

US 2017/0242279 A1 Aug. 24, 2017

Related U.S. Application Data

(60) Provisional application No. 62/299,229, filed on Feb. 24, 2016.

(51) Int. Cl.
| | | |
|---|---|---|
| *G02B 5/30* | (2006.01) | |
| *G02F 1/09* | (2006.01) | |
| *G02B 27/28* | (2006.01) | |
| *G02B 5/09* | (2006.01) | |
| *G02B 5/04* | (2006.01) | |

(52) U.S. Cl.
CPC .............. *G02F 1/093* (2013.01); *G02B 5/04* (2013.01); *G02B 5/09* (2013.01); *G02B 5/3025* (2013.01); *G02B 27/283* (2013.01); *G02B 27/286* (2013.01)

(58) Field of Classification Search
CPC .. G02B 5/3025; G02B 5/3041; G02B 27/286; G02B 27/283
USPC ........................ 359/485.06, 489.09
See application file for complete search history.

(56) References Cited

U.S. PATENT DOCUMENTS

| | | | |
|---|---|---|---|
| 3,677,621 A * | 7/1972 | Smith ................ | G02B 17/008 359/371 |
| 5,122,895 A | 6/1992 | Takanashi et al. | |
| 6,284,085 B1 | 9/2001 | Gwo | |
| 6,519,040 B1 * | 2/2003 | Amos ................. | G01J 3/2823 356/453 |
| 6,548,176 B1 | 4/2003 | Gwo | |
| 6,573,996 B1 * | 6/2003 | Deliwala ............. | G03F 7/70775 356/487 |

(Continued)

FOREIGN PATENT DOCUMENTS

KR 10-2013/0142056 A 12/2013

OTHER PUBLICATIONS

Azzam, "Relations between Amplitude Reflectances and Phase Shits of the p and s Polarizations when Electromagnetic Radiation Strikes Interfaces between Transparent Media.", University of New Orleans, Electrical Engineering Faculty Publication, R.M.A. Azzam, Applied Optics/vol. 18, No. 12/Jun. 15, 1979, p. 1884-1886. University of New Orleans, Electrical Engineering Faculty Publication.

*Primary Examiner* — Ricky D Shafer
(74) *Attorney, Agent, or Firm* — Thorpe, North & Western, LLP

(57) ABSTRACT

An optical device can be used for circularly polarizing light and/or removing reflected light from an optical system (optical isolation). The optical device can have a polarizing-cube including a pair of prisms and a polarizer. Each prism can have two ends linked by an inner face and two outer faces. The prisms can be attached together at the inner face of each with the polarizer sandwiched between the prisms. Fresnel rhomb(s) can be attached to outer face(s) of the prisms.

20 Claims, 7 Drawing Sheets

(56) References Cited

U.S. PATENT DOCUMENTS

| | | | |
|---|---|---|---|
| 6,690,513 B2 * | 2/2004 | Hulse | G02B 6/2713 |
| | | | 359/484.07 |
| 2002/0018288 A1 | 2/2002 | Rieger et al. | |
| 2003/0007157 A1 | 1/2003 | Hulse et al. | |
| 2003/0206345 A1 * | 11/2003 | Sabia | C03C 27/06 |
| | | | 359/484.03 |
| 2006/0221445 A1 * | 10/2006 | DiZio | G02B 5/3041 |
| | | | 359/485.06 |
| 2010/0096560 A1 | 4/2010 | Imanishi et al. | |
| 2010/0254008 A1 * | 10/2010 | Ono | G02B 1/11 |
| | | | 359/580 |

\* cited by examiner

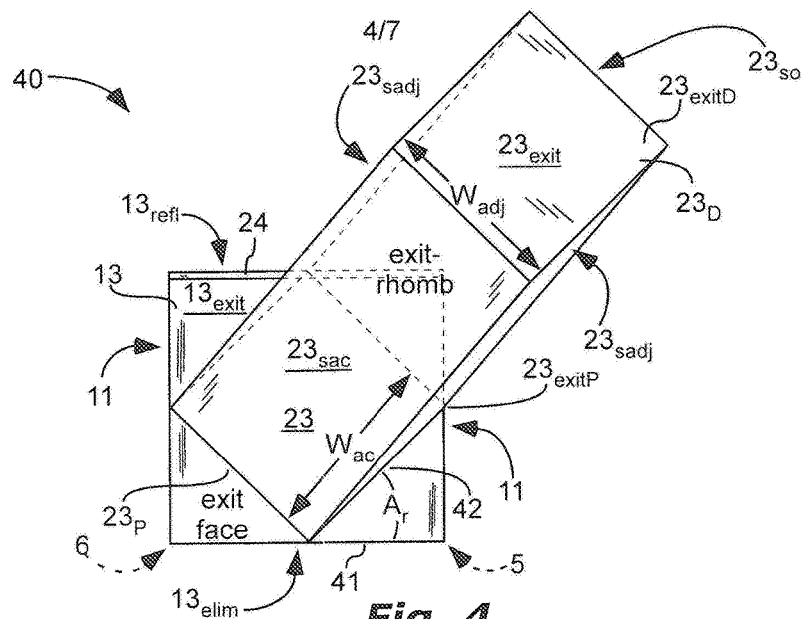
Fig. 4
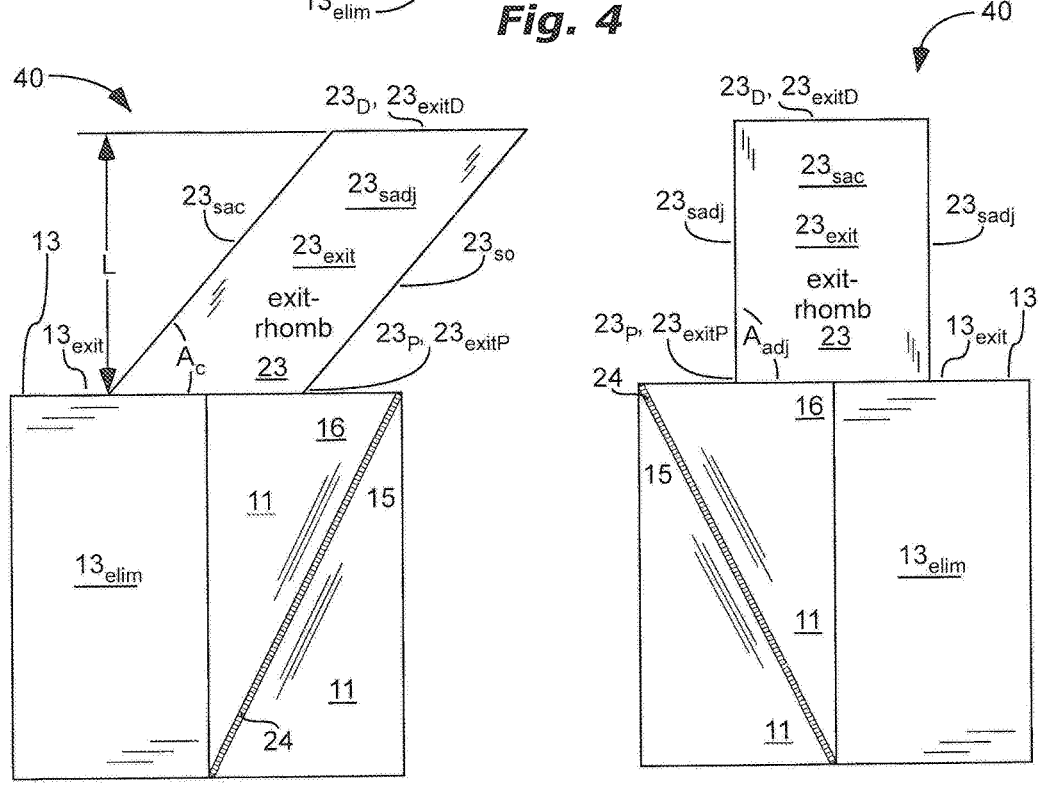
Fig. 5
Fig. 6

BROADBAND OPTICAL ISOLATOR OR CIRCULAR POLARIZER

CLAIM OF PRIORITY

This application claims priority to U.S. Provisional Patent Application No. 62/299,229, filed on Feb. 24, 2016, which is hereby incorporated herein by reference in its entirety.

FIELD OF THE INVENTION

The present application is related generally to optical devices, particularly optical isolators and circular polarizers.

BACKGROUND

Circularly-polarized light is used in various fields, including imaging/photography, microscopy, biology, data storage, astronomy, communication, and quality inspection. A circular polarizer can be used to create circularly-polarized light. Circular polarizers can be made by thin film technologies. A disadvantage of thin film circular polarizers is a narrow wavelength band of effective performance (e.g. typically <200 nm bandwidth). Circular polarizers can be expensive and complicated to manufacture. It would be beneficial to provide a circular polarizer capable of effectively polarizing a large bandwidth of light, and that could be manufactured relatively simply and inexpensively.

In some optical systems, light can reflect off of optical components. This reflected light can cause problems in some optical systems, such as for example lasers and image projectors. An optical isolator can be used to remove this reflected light from the optical system. Present optical isolators are usually manufactured using thin films, can have a narrow wavelength band of effective performance, can have a low laser-damage threshold, and can be expensive. It would be beneficial to provide a low-cost, high laser-damage threshold, broadband optical isolator with improved ability to withstand laser light.

SUMMARY

It has been recognized that it would be advantageous to provide a circular polarizer capable of effectively polarizing a large bandwidth of light and that could be manufactured relatively simply and inexpensively. It has been recognized that it would be advantageous to provide a low-cost, broadband optical isolator, with high laser-damage threshold. The present invention is directed to various embodiments of optical devices, including circular polarizers and optical isolators, and methods of removing reflected light from an optical system (optical isolation), that satisfy these needs. Each embodiment may satisfy one, some, or all of these needs.

The optical device can comprise a polarizing-cube including a pair of prisms and a polarizer. Each prism can have two ends linked by an inner face and two outer faces. The prisms can be attached together at the inner face of each with the polarizer sandwiched between the prisms. One outer-face of the first prism can define an entry-face and the other outer-face of the first prism can define a reflection-face. One outer-face of the second prism, located opposite of the entry-face of the first prism, can define an exit-face, and the other outer-face of the second prism, located opposite of the reflection-face of the first prism can define an elimination-face. One or more Fresnel rhombs can be attached to an outer face of the prism(s). In one embodiment, the entry-face is not parallel to the exit-face.

A method of removing reflected light from an optical system can comprise (1) emitting light from a light source into an optical isolator, similar to the optical device described above; (2) passing light from the light source, having a first-polarization, through the polarizer and into a Fresnel rhomb (exit-rhomb); (3) circularly polarizing the light in the exit-rhomb and emitting the circularly-polarized light from the distal-end of the exit-rhomb into an optical system; (4) reflecting at least a portion of the circularly-polarized light from the optical system back into the exit rhomb; (5) linearly polarizing, in the exit-rhomb, the circularly-polarized light reflected off of the optical system, to a second-polarization, the second-polarization being opposite of the first-polarization; (6) emitting the light with the second-polarization from the exit-rhomb through the exit-face of the second prism into the second prism, then to the polarizer; and (7) reflecting the light with the second-polarization from the exit-rhomb off of the polarizer to the elimination-face.

BRIEF DESCRIPTION OF THE DRAWINGS

FIGS. 4-6 are a schematic perspective views of an optical device 40, similar to optical device 20, except that optical device 40 includes a single Fresnel rhomb 23 and shows dimensions (length L, width $W_{adj}$, and width $W_{ac}$) angles (acute-angle $A_c$, adjacent-angle $A_{adj}$, and angle-of-rotation $A_r$) of the Fresnel rhomb 23, in accordance with an embodiment of the present invention.

DEFINITIONS

As used herein, the term "cube" means an approximately cube-shaped optical device, usually with six sides. Opposite sides are usually, but not necessarily parallel. Corners are usually, but not necessarily perpendicular. The sides do not have to have the same area with respect to each other. Examples of cubes are shown in the figures (prisms 15 and 16 sandwiched together with polarizer 24 therebetween).

DETAILED DESCRIPTION

Figure 1:
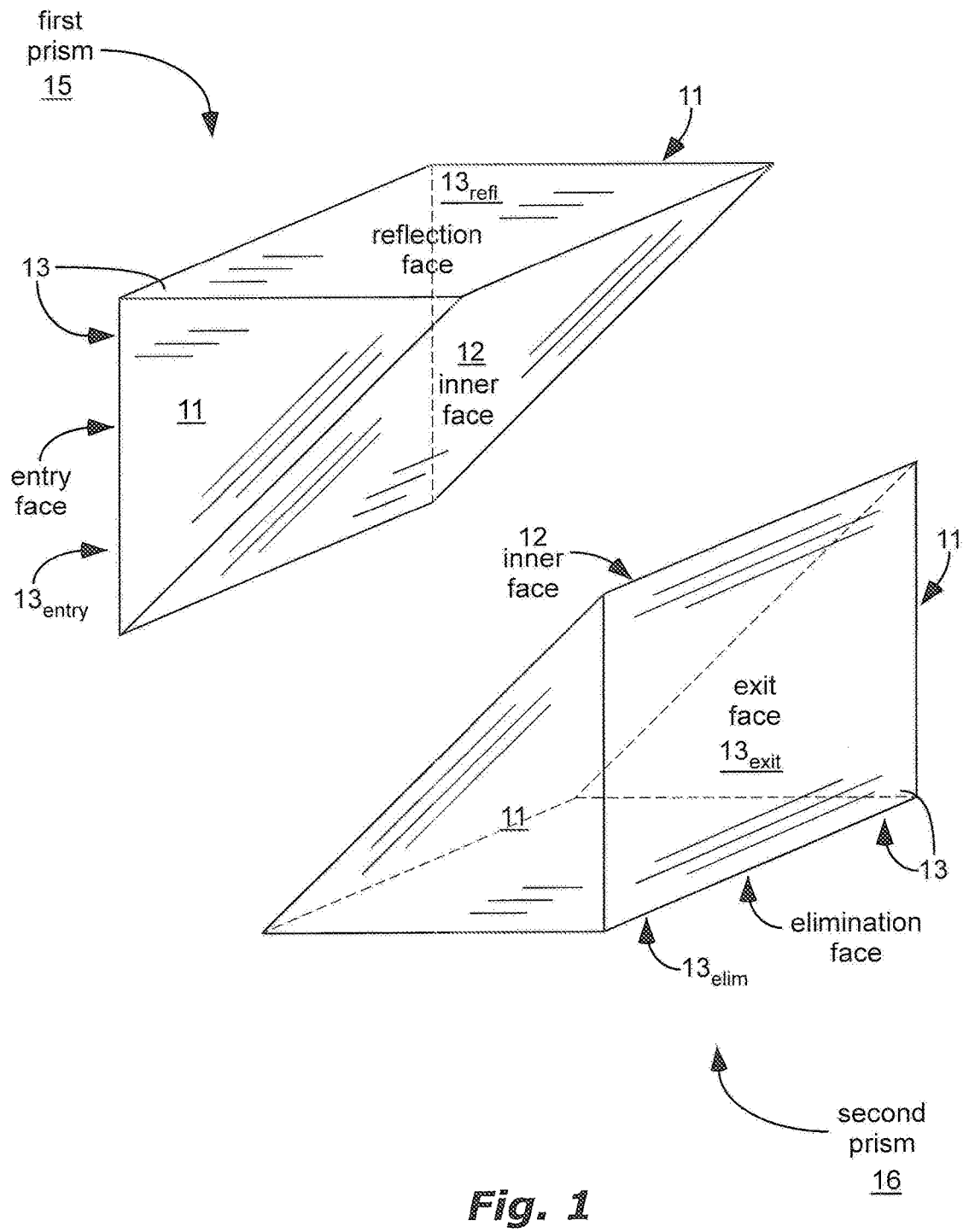
FIG. 1 is a schematic perspective view of two prisms 15 and 16 for use in an optical device, in accordance with an embodiment of the present invention.
Figure 11:
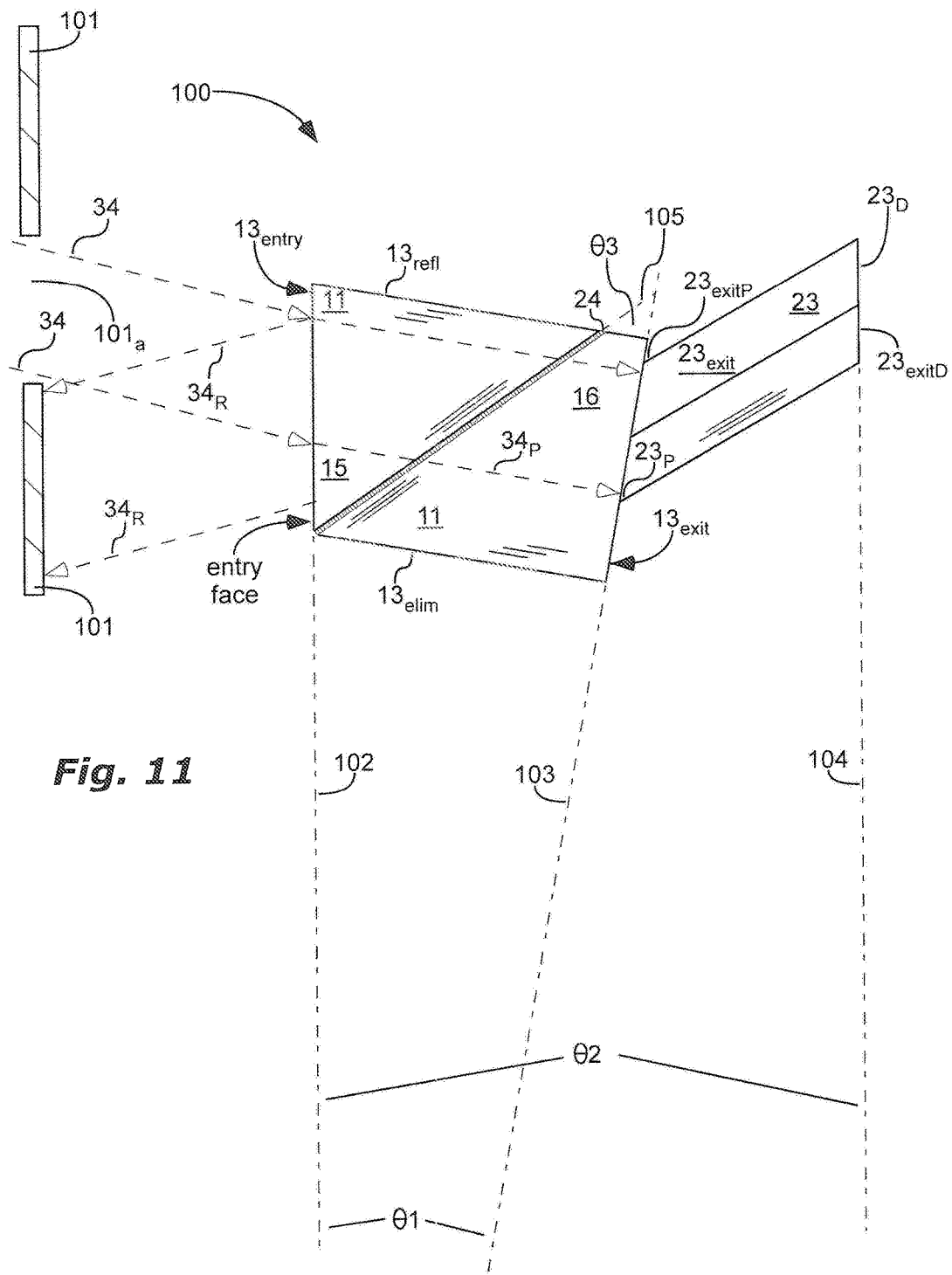
FIG. 11 is a schematic perspective view of an optical device 100, including a polarizer 24 sandwiched between two prisms 15 and 16, and a Fresnel rhomb 23 attached to one of the prisms 16, in accordance with an embodiment of the present invention.

Illustrated in FIG. 1 are two prisms, including a first prism 15 and a second prism 16, for use in optical device 20 (see FIGS. 2-3), optical device 40 (see FIGS. 4-6), or optical device 100 (see FIG. 11). Each prism 15 and 16 can have two ends 11 linked by an inner face 12 and two outer faces 13. The ends 11 can be linked by additional faces (see for example prism 16 in FIG. 11); thus, the term "two outer faces" does not restrict the prism 15 or 16 from having more than two outer faces. The ends 11 can be triangular-shaped, or can be another shape as shown in prism 16 in FIG. 11. The inner face 12 and the two outer faces 13 of the prisms 15 and 16 can be rectangular-shaped, square-shaped, or can have a different shape.

One outer-face 13 of the first prism 15 is called an entry-face $13_{entry}$ and the other outer-face 13 of the first prism 15 is called a reflection-face $13_{refl}$. One outer-face 13 of the second prism 16, which can be located opposite of the entry-face entry of $13_{entry}$ of the first prism 15 when assembled into an optical device 20, 40, or 100, is called an exit-face $13_{exit}$, and the other outer-face 13 of the second prism 16, which can be located opposite of the reflection-face $13_{refl}$ of the first prism 15 when assembled into an optical device 20, 40, or 100, is called an elimination-face $13_{elim}$.

Figure 2:
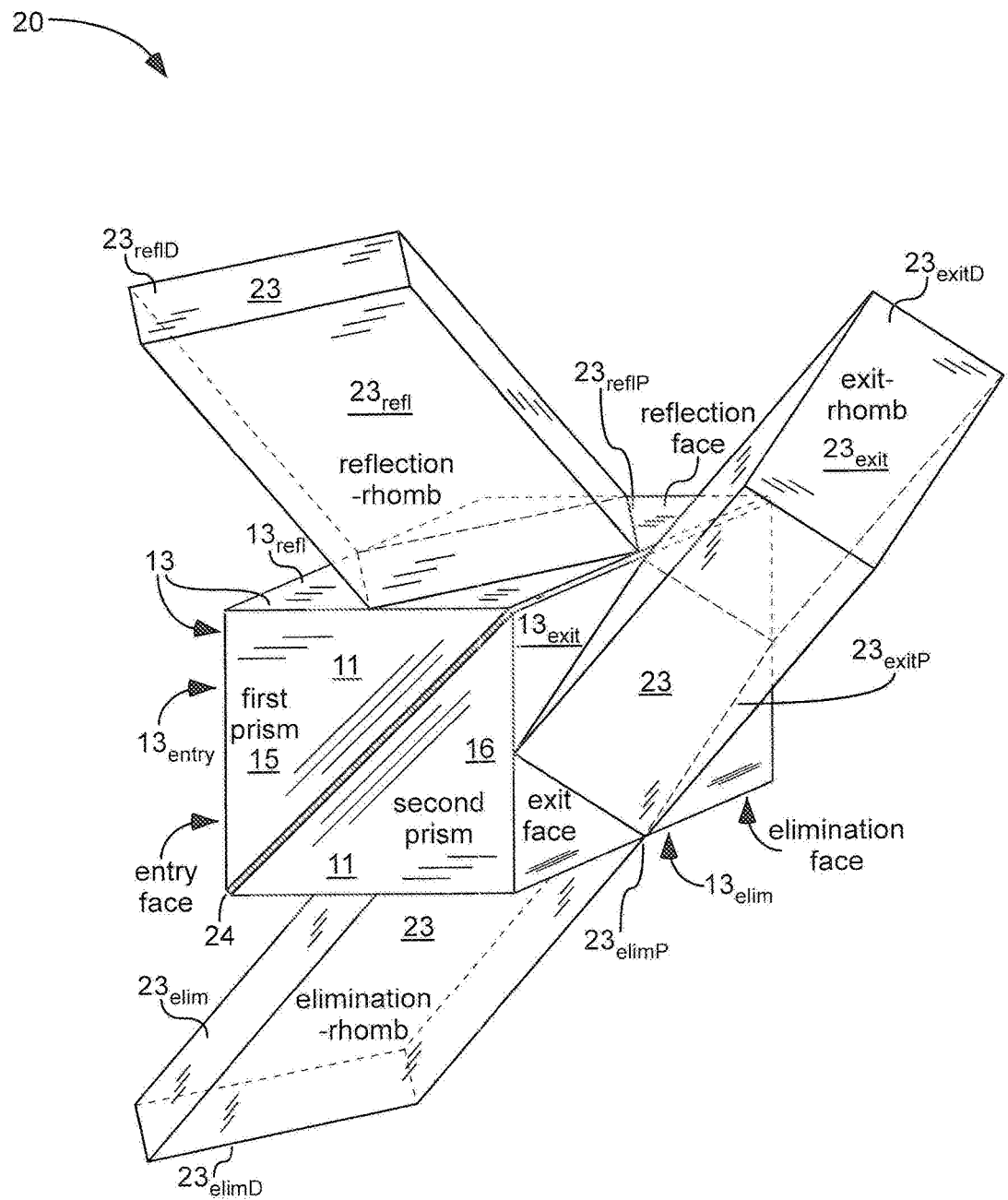
FIG. 2 is a schematic perspective view of an optical device 20, including a polarizer 24 sandwiched between two prisms 15 and 16, and three Fresnel rhombs 23 attached to the prisms 15 and 16, in accordance with an embodiment of the present invention.
Figure 3:
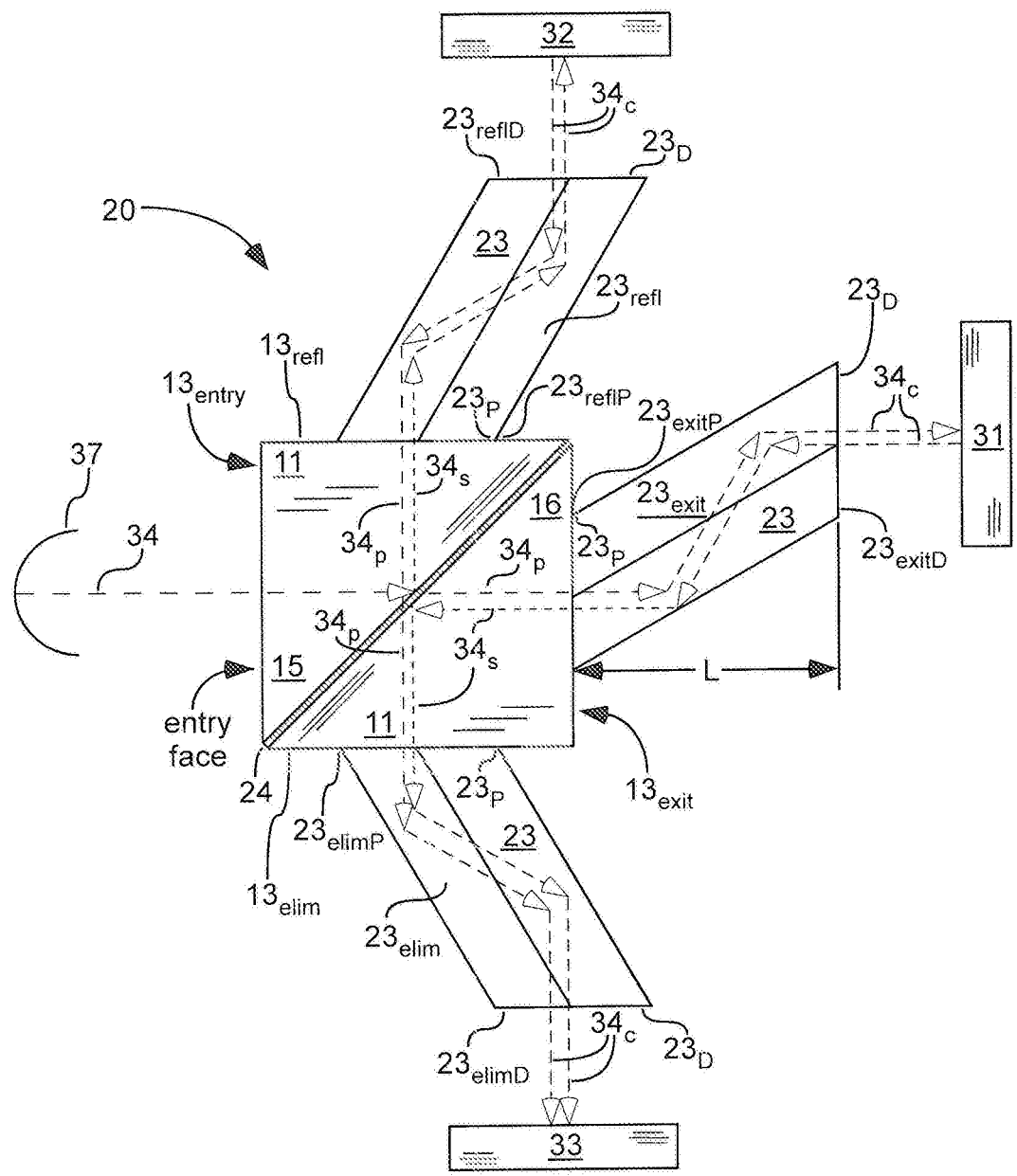
FIG. 3 is a schematic top view of the optical device 20 of FIG. 2, illustrating light 34 passing through the optical device 20, to circularly-polarize the light 34 and/or to provide optical isolation, in accordance with an embodiment of the present invention.

Shown in FIGS. 2-3 are two views of an optical device 20, shown in FIGS. 4-6 are three views of an optical device 40, and shown in FIG. 11 is one view of an optical device 100, each of which can be used as a circular polarizer or as an optical isolator. These optical devices 20, 40, and 100 can be broadband (e.g. can effectively polarize a wavelength range of >200 nm in one aspect, >300 nm in another aspect, >400 nm in another aspect, or about 400-1500 nm in another aspect). Because these optical devices 20, 40, and 100 can be made from durable glass prisms and durable wire grid polarizers, they can have a high laser-damage threshold. Because of the simplicity of these optical devices 20, 40, and 100, they can be relatively inexpensive.

The first prism 15 and the second prism 16 can be attached together at the inner face 12 of each with a polarizer 24 sandwiched between the prisms 15 and 16, forming a polarizing-cube. One, two, three, or more Fresnel rhombs 23 can be each attached to an outer face 13 of one of the prisms 15 or 16. "Attached" means (1) the prism 15 or 16 and the Fresnel rhomb 23 are integrally-formed together; or (2) the prism 15 or 16 and the Fresnel rhomb 23 were manufactured separately, then attached by some method such as adhesive or fusion. Each Fresnel rhomb 23 can be attached to a different outer face 13 than the other. If there are only two Fresnel rhombs 23, each can be attached to the same prism 15 or 16, but typically each will be attached to a different prism 15 or 16 than the other.

One of the Fresnel rhombs 23, called an exit-rhomb $23_{exit}$, can have a proximal-end $23_{exitP}$ attached to the exit-face $13_{exit}$ of the second prism 16 and can have a distal-end $23_{exitD}$ spaced apart from the exit-face $13_{exit}$ and opposite of the proximal-end $23_{exitP}$. Another of the Fresnel rhombs 23, called a reflection-rhomb $23_{refl}$, can have a proximal-end $23_{reflP}$ attached to the reflection-face $13_{refl}$ of the first prism 16 and can have a distal-end $23_{reflD}$ spaced apart from the reflection-face $13_{refl}$ and opposite of the proximal-end $23_{reflP}$. Another of the Fresnel rhombs 23, called an elimination-rhomb $23_{elim}$, can have a proximal-end $23_{elimP}$ attached to the elimination-face $13_{elim}$ of the second prism 16 and can have a distal-end $23_{elimD}$ spaced apart from the elimination-face $13_{elim}$ and opposite of the proximal-end $23_{elimP}$.

The Fresnel rhomb(s) 23 can be attached to the prism(s) 15 or 16 by an adhesive. Adhesives can adversely affect the optical properties of transmitted light, so integrally-forming each prism 15 or 16 with its associated Fresnel rhomb(s) 23, or use of an adhesore-free, optical-bonding method may be preferred. For example, see U.S. Pat. No. 6,548,176 and U.S. Pat. No. 6,284,085, both of which are incorporated herein by reference.

Optical properties of transmitted light can be improved if the Fresnel rhomb(s) 23 and the prisms 15 and 16 are made of the same materials. The prisms 15 and 16 and the Fresnel rhomb(s) 23 can be transparent in a light wavelength range of intended use (e.g. infrared light, visible light, ultraviolet light).

An antireflective coating can be applied to faces of the prisms 15 and 16 and faces of the Fresnel rhomb(s) 23 to reduce reflection of entering light. An absorptive coating can be applied to some faces of the prisms 15 and 16 and faces of the Fresnel rhomb(s) 23 to absorb light and prevent or minimize it from exiting through such faces.

Methods of Using

Methods of using optical device 20 are illustrated in FIG. 3. A light source 37 can emit light 34 into the entry-face $13_{entry}$ of the first prism 15. Light with a first-polarization $34_p$ (e.g. p-polarized light) can pass through the polarizer 24 and into the proximal-end $23_{exitP}$ of the exit-rhomb $23_{exit}$ where it can be circularly-polarized. The light 34 can be broadband, and the optical device 20 can provide a broad bandwidth of circularly-polarized light $34_c$, such as for example at least 400 nanometers in one aspect, at least 1000 nanometers in another aspect, or at least 1500 nanometers in another aspect. Optical devices 40 and 100 also can similarly provide a broad bandwidth of circularly-polarized light.

This circularly-polarized light $34_c$ can be absorbed at or emitted from the distal-end $23_{exitD}$ of the exit-rhomb $23_{exit}$ into an optical system 31. The optical system 31 can be a beam dump for removing light, a sensor, or other optical device, such as a device that utilizes circularly-polarized light.

At least a portion of the circularly-polarized light $34_c$ can be emitted from or reflected back from the optical system 31 into the distal-end $23_{exitD}$ of the exit rhomb $23_{exit}$ and can be linearly polarized in the exit-rhomb $23_{exit}$ to a second-polarization $34_s$ (e.g. s-polarized light), the second-polarization $34_s$ being opposite of the first-polarization $34_p$. This light with the second-polarization $34_s$ from the exit-rhomb $23_{exit}$ can pass through the exit-face $13_{exit}$ into of the second prism 16, and to the polarizer 24, where it can reflect off of the polarizer 24 towards and at least partially absorbed at and/or transmitted at least partially through the elimination-face $13_{elimP}$.

A second-polarization of light $34_s$ (e.g. s-polarized light), from the light source 37, can reflect off of the polarizer 24 and can be at least partially absorbed at and/or transmitted at least partially through the reflection-face $13_{refl}$. The optical device 20 can include another Fresnel rhomb 23, called a reflection-rhomb $23_{refl}$, described above, attached to the reflection-face $13_{refl}$. The second-polarization of light $34_s$, if transmitted through the reflection-face $13_{refl}$ can transmit into the proximal-end reflection-rhomb $23_{refl}$ where it can be circularly polarized as it passes through the reflection-rhomb $23_{refl}$. The circularly-polarized light $34_c$ can be absorbed at or enter a second optical system 32. The second optical system 32 can be located to face and receive light from the distal-end $22_{reflD}$ of the reflection-rhomb $23_{refl}$.

The second optical system 32 can be a device that utilizes circularly-polarized light. The second optical system 32 can be or can include a sensor for analyzing the circularly-polarized light $34_c$ from the reflection-rhomb $23_{refl}$. The sensor can provide corrective feedback for the light source 37 based on this analysis. For example, the sensor can indicate the amount of light it receives, which indicates the amount of the second-polarization of light $34_s$ emitted from the light source 37. Alternatively, the second optical system 32 can be or can include a beam dump for removing light from the overall optical system.

At least a portion of the circularly-polarized light $34_c$ can be emitted from or reflected back from the second optical system 32 and into and through the reflection-rhomb $23_{refl}$, where it can be linearly polarized to the first polarization $34_p$ (e.g. p-polarized light) and emitted from the proximal-end $23_{reflP}$ of the reflection-rhomb $23_{refl}$ to and through the polarizer 24 then to and at least partially absorbed at and/or at least partially transmitted through the elimination-face $13_{elim}$.

The optical device 20 can include another Fresnel rhomb 23, called an elimination-rhomb $23_{elim}$, as described above, attached to the elimination-face $13_{elim}$. The second-polarization of light $34_s$ reflected off of the polarizer 24 from the exit-rhomb $23_{exit}$ and/or the first polarization $34_p$ of light emitted through the polarizer 24 from the reflection-rhomb $23_{refl}$ can enter the proximal-end $23_{elimP}$ of the elimination-rhomb $23_{elim}$ where it can be circularly polarized as it passes through the elimination-rhomb $23_{elim}$. The circularly-polarized light $34_c$ can be absorbed at or enter a third optical system 33. The third optical system 33 can be located to face and receive light from the distal-end $23_{elimD}$ of the elimination-rhomb $23_{refl}$.

The third optical system 33 can be a device that utilizes circularly-polarized light. The third optical system 33 can be or can include a sensor for analyzing the circularly-polarized light $34_c$ from the elimination-rhomb $23_{elim}$. The sensor can provide corrective feedback for the light source 37 based on this analysis. Alternatively, the third optical system 33 can be or can include a beam dump for removing light from the overall optical system.

Dimensions and Angles

As shown in FIGS. 4-6, each of the Fresnel rhombs 23 can have four sides $23_{sac}$, $23_{so}$, $23_{sadj}$, and $23_{sadj}$, extending between two ends $23_P$ and $23_D$. The four sides $23_{sac}$, $23_{so}$, $23_{sadj}$, and $23_{sadj}$ can include an acute-angle-side $23_{sac}$, an opposite-side $23_{so}$ that is opposite of the acute-angle-side $23_{sac}$, and two adjacent-sides $23_{sadj}$ that are adjacent to and extend between the acute-angle-side $23_{sac}$ and the opposite-side $23_{sc}$.

Each Fresnel rhomb 23 can have (1) an acute-angle $A_c$ which is an internal angle between the acute-angle-side $23_{sac}$ and the outer face 13 to which it is attached; (2) an adjacent-angle $A_{adj}$ which is an internal angle between one or both of the two adjacent-sides $23_{adj}$ of each of the Fresnel rhombs 23 and the outer-face of the prism 15 or 16 to which it is attached; and (3) an angle-of-rotation $A_r$ between a plane 41 parallel to at least one of the ends of the prisms 15 or 16 and an edge 42 of the Fresnel rhomb 23 where the Fresnel rhomb 23 attaches to the outer face 13.

Each Fresnel rhomb 23 can have (1) a width Wa, between the acute-angle-side $23_{sac}$ and the opposite-side $23_{so}$; (2) a width $W_{adj}$ between two adjacent-sides $23_{sadj}$; and (3) a length L between the ends $23_P$ and $23_D$. The widths $W_{ac}$ and $W_{adj}$ are measured at an angle parallel to the outer-face 13 to which the Fresnel rhomb 23 is attached. The length L is measured perpendicular to the outer-face 13 to which the Fresnel rhomb 23 is attached.

The acute-angle $A_c$, the adjacent-angle $A_{adj}$, the angle-of-rotation $A_r$, widths $W_{ac}$ and $W_{adj}$, and the length L can be configured to produce circularly-polarized light. Details of these angles and dimensions will be described in the following few paragraphs. Information related to these dimensions and angles is taught in R.M.A. Azzam, "Relations between amplitude reflectances and phase shifts of the p and s polarizations when electromagnetic radiation strikes interfaces between transparent media," Appl. Opt. 18, 1884-1886 (1979), which is incorporated herein by reference.

Snell's law states that light which encounters the interface of two mediums will be refracted according to the equation:

$$n_1 \sin \theta_i = n_2 \sin \theta_t;$$

where $n_1$=index of refraction of the first medium, $\theta_1$=Angle of Incidence of the light at the interface between the two mediums, $n_2$=index of refraction of the second medium, and $\theta_t$=transmitted angle through the second medium. Both angles $\theta_i$ and $\theta_t$ are measured with respect to a line perpendicular to a plane of contact between the two mediums.

Figure 7:
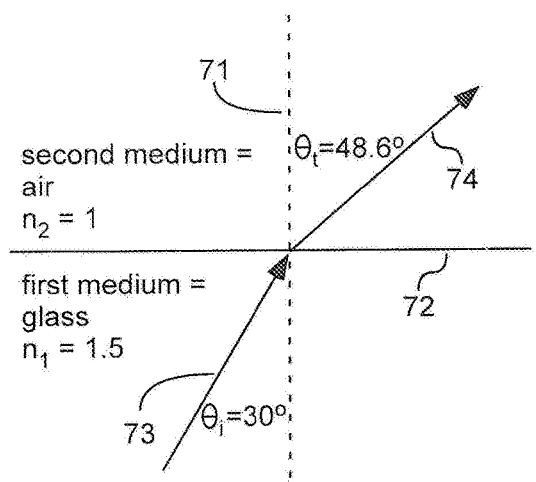
FIG. 7 is a schematic side view of an interface between first and second mediums, and shows light transmitted from first medium (glass) into second medium (air), with $n_1 > n_2$ and $\theta_i < \theta_c$, where $n_1$ is an index of refraction of the first medium, $n_2$ is an index of refraction of the second medium, $\theta_i$=the Angle of Incidence of the light, and $\theta_c$ is the critical angle.

For example, FIG. 7 shows an incident light beam 73 transmitted through a first medium (e.g. glass with $n_1$=1.5) into the second medium (e.g. air with $n_2$=1). The incident light beam 73 has an Angle of Incidence $\theta_i$=30°. According to Snell's law, the transmitted light beam 74 has a transmitted angle $\theta_t$=48.6°. The Angle of Incidence $\theta_i$ and the transmitted angle $\theta_t$ are measured with regard to a line 71 perpendicular to a plane of contact 72 between first medium and second medium.

If $n_1 > n_2$ (e.g. glass is the first medium with $n_1$=1.5 and air is the second medium with $n_2$=1), there exists an angle of incidence $\theta_i$ above which all incident light is reflected, called the critical angle $\theta_c$. The critical angle ($\theta_i = \theta_c$) occurs when $\theta_t$=90° and $\sin \theta_t$=1. Rearranging Snell's law with the new values:

$$\theta_c = \sin^{-1}\left(\frac{n_2}{n_1}\right)$$

Figure 8:
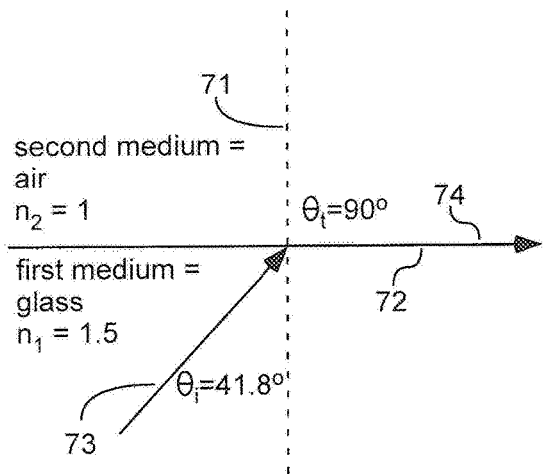
FIG. 8 is a schematic side view of an interface between first and second mediums, and is similar to FIG. 7, except that $\theta_i = \theta_c$.
Figure 9:
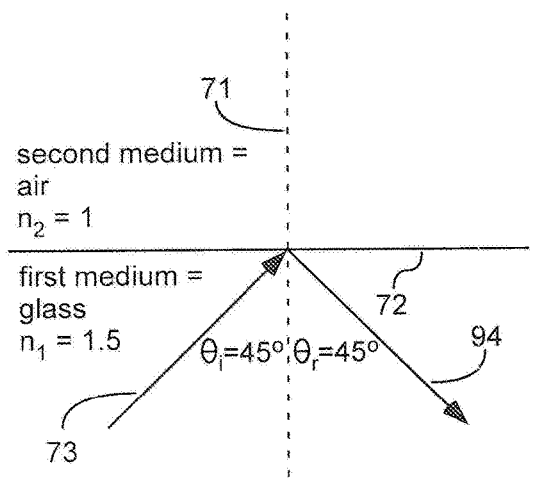
FIG. 9 is a schematic side view of an interface between first and second mediums, and is similar to FIG. 7, except that $\theta_i > \theta_c$.

For example, FIG. 8 shows an incident light beam 73 with an Angle of Incidence $\theta_i$=41.8° that is equal to the critical angle $\theta_c$. According to Snell's law, the transmitted light 74 has a transmitted angle $\theta_t$=90°, i.e. along the plane of contact 72 between the two mediums. FIG. 9 shows an incident light beam 73 with an Angle of Incidence $\theta_i$=45°, which is greater than the critical angle $\theta_c$ (41.8°). Therefore, there is no transmitted light beam 74, but instead there is a reflected light beam 94 with an angle of reflection $\theta_r$ that is equal to the Angle of Incidence $\theta_i$=45°.

For light transmitting from N-BK7 glass (the first medium) to air (the second medium), the critical angle $\theta_c$ for different wavelengths is shown in the following table:

| Wavelength (nm) | Index of Refraction (n1) | Critical Angle $\theta_c$ (degrees) |
| --- | --- | --- |
| 300 | 1.5528 | 40.1 |
| 400 | 1.5308 | 40.8 |
| 500 | 1.5214 | 41.1 |

-continued

| Wavelength (nm) | Index of Refraction (n1) | Critical Angle $\theta_c$ (degrees) |
|---|---|---|
| 600 | 1.5163 | 41.3 |
| 700 | 1.5131 | 41.4 |
| 800 | 1.5108 | 41.4 |
| 1000 | 1.5075 | 41.6 |

Light, in the wavelength range of 300-1000 nanometers (nm), transmitted through N-BK7 glass (first medium) towards air (second medium), will reflect back into the N-BK7 glass as long as the Angle of Incidence $\theta_i$ is greater than 41.6 degrees (the largest critical angle $\theta_c$ of all wavelengths in the range).

The function of a Fresnel rhomb 23 is to take linearly polarized light and convert it into circularly polarized light. For circularly polarized light:
1. The linearly-polarized components (s and p) have the same amplitude; and
2. The linearly-polarized components (s and p) have a 90° phase shift with regard to each other.

Regarding item #1 for circularly polarized light, proper angle-of-rotation $A_r$ and adjacent-angle $A_{adj}$ (both defined above and shown in FIGS. 4 and 6 respectively) can result in the linearly-polarized components (s and p) having the same amplitude.

Typically, in a polarizing-cube, wires of the polarizer 24 (if the polarizer 24 is a wire grid polarizer) extend between and perpendicular to the ends 11 of the prisms 15 and 16 (i.e. into the page of FIG. 3). With wires of the polarizer 24 extending in the direction just noted, ideal angle-of-rotation $A_r$ is 45 degrees. Examples of acceptable angle-of-rotation $A_r$ include at least 43 degrees in one aspect, at least 44 degrees in another aspect, or at least 44.5 degrees in another aspect, and less than 45.5 degrees in one aspect, less than 46 degrees in another aspect, or less than 47 degrees in another aspect. If the wires of the polarizer 24 extend in a 45 degree diagonal across the inner face 12 of the prisms, then the ideal angle-of-rotation $A_r$ can be 0 degrees.

Ideal adjacent-angle $A_{adj}$ is 90 degrees, but examples of acceptable adjacent-angles $A_{adj}$ include at least 88 degrees in one aspect, at least 89 degrees in another aspect, or at least 89.5 degrees in another aspect, and less than 90.5 degrees in one aspect, less than 91 degrees in another aspect, or less than 92 degrees in another aspect.

Regarding item #2 for circularly polarized light, a total phase shift difference of 90° can be achieved by two internal reflections that each induce a phase shift of 45°. For total internal reflection (TIR), the phase shift between the two polarization states is governed by:

$$\tan\frac{\Delta}{2} = \frac{(N^2(\sin\theta_i)^2 - 1)^{1/2}}{N\sin\theta_i\tan\theta_i}$$

where $\Delta$=phase shift, N=n1/n2, and $\theta_i$=Angle of Incidence.

Figure 10:
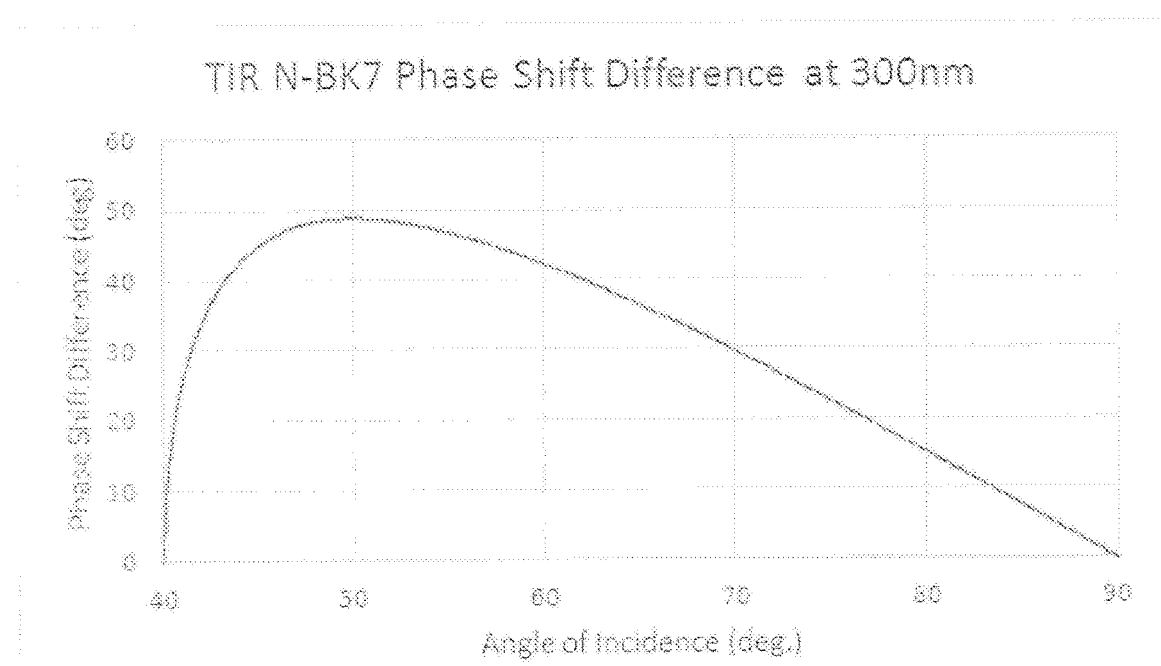
FIG. 10 is a graph of phase shift difference versus angle of incidence for N-BK7 glass during total internal reflection (TIR).

For N-BK7 glass surrounded by air, and 300 nm incident light, the graph in FIG. 10 illustrates the phase shift experienced during TIR.

The Fresnel rhomb can produce circularly polarized light with two phase shifts of 45°, which occurs either at an Angle of Incidence of 45.1° or 57.2°. The below table shows the two Angles of Incidence AOI 1 and AOI 2 at which this 45° phase delay occurs for different wavelengths of light in N-BK7 glass surrounded by air.

| Wavelength (nm) | Index of Refraction (n1) | AOI 1 | AOI 2 |
|---|---|---|---|
| 300 | 1.5528 | 45.1 | 57.2 |
| 400 | 1.5308 | 46.3 | 56.3 |
| 500 | 1.5214 | 47.3 | 55.7 |
| 600 | 1.5163 | 47.8 | 55.2 |
| 700 | 1.5131 | 48.3 | 55 |
| 800 | 1.5108 | 48.5 | 54.7 |
| 900 | 1.509 | 48.7 | 54.6 |
| 1000 | 1.5075 | 48.9 | 54.3 |

The widths $W_{ac}$ and $W_{adj}$ and the length L can be adjusted to ensure that there are two reflections of the light prior to exiting the Fresnel rhomb 23. Width $W_{ac}$ can equal width $W_{adj}$. Following are example materials, dimensions, and angles of a Fresnel rhomb 23 to circularly-polarize light:
1. Fresnel rhomb material: N-BK7
2. Surrounding medium: air
3. Light wavelength range 400-1500 nm
4. Acute-angle $A_c$=55.3°
5. Adjacent-angle $A_{adj}$=90°
6. Angle-of-rotation $A_r$=45°
7. Width $W_{ac}$=10 mm
8. Width $W_{adj}$=10 mm
9. Length L=19.166 mm In order to circularly polarize a large amount of light entering the optical device 20 or 40, it can be important for each Fresnel rhomb 23 to cover a large percent of the outer face 13 to which each is attached. For example, the Fresnel rhomb(s) 23 can cover at least 35% in one aspect, at least 40% in another aspect, at least 45% in another aspect, or at least 50% in another aspect, of the outer face 13 to which it is attached.

Optical device 100 in FIG. 11 can be particularly useful for optical isolation. Light 34 can pass through an aperture $101_a$ of a light blocking device 101. A light source 37 (shown in FIG. 3) and the aperture $101_a$ can be positioned for non-normal incident light on the entry-face $13_{entry}$ of the first prism 15. By proper selection of the size of the aperture $101_a$, distance of the light blocking device 101 from the entry-face $13_{entry}$, and angle of incidence of the light 34, reflected light $34_R$ from the entry-face $13_{entry}$ can be blocked and also possibly absorbed by the light blocking device 101.

It can be important, for circular polarization of light 34 in the exit-rhomb $23_{exit}$, for the light 34 to exit perpendicularly through the exit-face $13_{exit}$ of the second prism 16. Therefore, because light incident on the entry-face $13_{entry}$ is not normal to it, the entry-face $13_{entry}$ and the exit-face $13_{exit}$ in this embodiment won't be parallel. For example, an angle θ1 between a plane 102 of the entry-face $13_{entry}$ of the first prism 15 and a plane 103 of the exit-face $13_{exit}$ of the second prism can be: at least 3° in one aspect, at least 6° in another aspect, between 4.5° and 13° in another aspect, or between 6° and 11° in another aspect.

It can be important, for circular polarization of light 34 in the exit-rhomb $23_{exit}$, for the entry-face $13_{entry}$ the first prism 15 and the distal-end $23_{exitD}$ of the exit-rhomb $23_{exit}$ to be parallel or very close to parallel. Therefore an angle θ2 between a plane 102 of the entry-face $13_{entry}$ the first prism 15 and a plane 104 of the distal-end $23_{exitD}$ of the exit-rhomb $23_{exit}$ can be <2° in one aspect, <1° in another aspect, <0.5° in another aspect, or <0.1° in another aspect.

It can be helpful in some applications for an angle θ3 between a plane 103 of the exit-face $13_{exit}$ of the second prism 16 and a plane 105 of the polarizer 24 to be equal or close to 45°, such as for example in the range of 45°+/−1.5° in one aspect or 45°+/−5° in another aspect.

What is claimed is:

1. An optical device comprising a polarizing-cube including a pair of prisms and a polarizer, wherein each prism has two ends linked by an inner face and two outer faces and the prisms are attached together at the inner face of each with the polarizer sandwiched between the prisms; and three Fresnel rhombs, each attached to an outer face of one of the prisms, and each attached to a different outer face than the others.

2. The optical device of claim 1, wherein the three Fresnel rhombs are attached to the prisms by an adhesive-free, optical-bond.

3. The optical device of claim 1, wherein each of two of the three Fresnel rhombs is attached to a different prism than the other.

4. The optical device of claim 1, wherein the pair of prisms and the three Fresnel rhombs are made of the same material.

5. The optical device of claim 1, wherein each prism is transparent.

6. The optical device of claim 1, wherein an angle-of-rotation of each of the Fresnel rhombs is between 44 degrees and 46 degrees, where the angle-of-rotation is an angle between a plane parallel to at least one of the ends of the prisms and an edge of the Fresnel rhomb where the Fresnel rhomb attaches to the outer face.

7. The optical device of claim 1, wherein:
each of the Fresnel rhombs has four sides extending between two ends;
one of the two ends of each of the Fresnel rhombs is attached to one of the prisms;
the four sides include:
  i) an acute-angle-side having an acute-angle that is an internal angle between the acute-angle-side and the outer face to which the acute-angle-side is attached;
  ii) an opposite-side that is opposite of the acute-angle-side; and
  iii) two adjacent-sides that are adjacent to and extend between the acute-angle-side and the opposite-side; and
the acute-angle of each of the Fresnel rhombs, and a length of each of the Fresnel rhombs between the ends thereof, are configured for two internal reflections of a wavelength of light in-t-la-e a wavelength range of intended use.

8. The optical device of claim 7, wherein an internal angle, between each of the two adjacent-sides of each of the Fresnel rhombs and the outer-face of the prism to which the outer-face is attached, is between 89 degrees and 91 degrees.

9. The optical device of claim 1, wherein each of the three Fresnel rhombs has a length for circular polarization of light.

10. The optical device isolator of claim 1, wherein each of the three Fresnel rhombs covers at least 35% of the outer face to which each is attached.

11. The optical device of claim 1, wherein:
the pair of prisms define a first prism and a second prism;
one outer-face of the first prism defines an entry-face and the other outer-face of the first prism defines a reflection-face;
one outer-face of the second prism, located opposite of the entry-face of the first prism, defines an exit-face, and the other outer-face of the second prism, located opposite of the reflection-face of the first prism defines an elimination-face; and
an angle (θ1) between a plane of the entry-face of the first prism and a plane of the exit-face of the second prism is at least 3°.

12. The optical device of claim 11, wherein θ1 is at least 6°.

13. The optical device of claim 11, wherein θ1 is between 4.5° and 13°.

14. The optical device of claim 11, wherein θ1 is between 6° and 11°.

15. The optical device of claim 11, wherein: one of the three Fresnel rhombs, defining an exit-rhomb, has a proximal-end attached to the exit-face of the second prism and a distal-end spaced apart from the exit-face and opposite of the proximal-end; and an angle between the entry-face of the first prism and a plane of the distal-end of the Fresnel rhomb is <2°.

16. The optical device of claim 15, wherein the angle between the entry-face of the first prism and the plane of the distal-end of the Fresnel rhomb is <0.1°.

17. The optical device of claim 1, wherein:
the pair of prisms define a first prism and a second prism;
one outer-face of the first prism defines an entry-face and the other outer-face of the first prism defines a reflection-face;
one outer-face of the second prism, located opposite of the entry-face of the first prism, defines an exit-face, and the other outer-face of the second prism, located opposite of the reflection-face of the first prism defines an elimination-face; and
an angle between a plane of the exit-face of the second prism and a plane of the polarizer is in the range of 45°+/−5°.

18. The optical device of claim 17, wherein the angle between the plane of the exit-face of the second prism and the plane of the polarizer is in the range of 45°+/−1.5°.

19. The optical device of claim 1, wherein each Fresnel rhomb is integrally-formed with the prism to which it is attached.

20. The optical device of claim 1, wherein each of the three Fresnel rhombs covers at least 50% of the outer face to which each is attached.

* * * * *